UNITED STATES PATENT OFFICE.

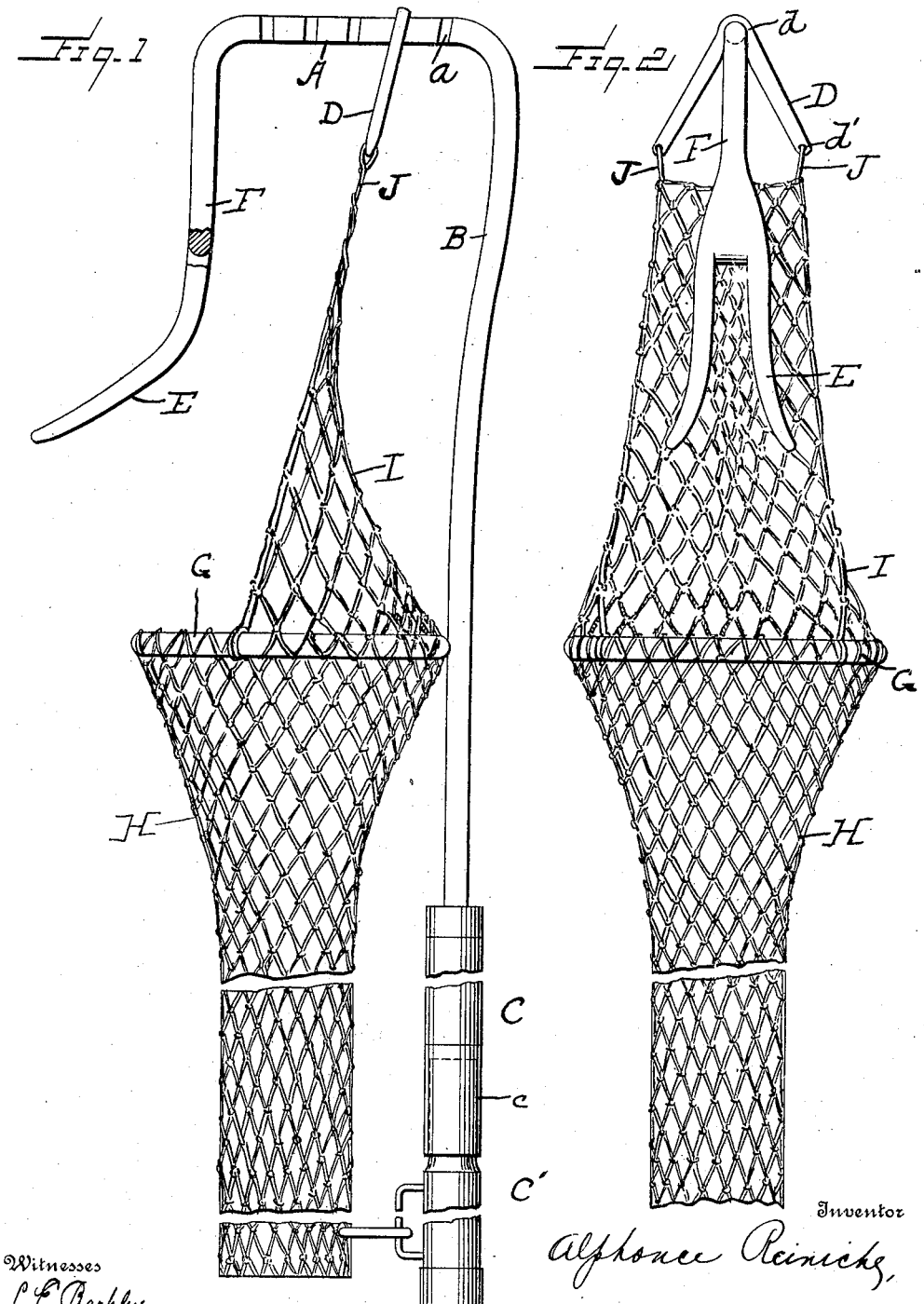

ALPHONCE REINICHE, OF READING, MICHIGAN.

FRUIT-GATHERER.

No. 891,373.

Specification of Letters Patent.

Patented June 23, 1908.

Application filed March 24, 1908. Serial No. 422,998.

*To all whom it may concern:*

Be it known that I, ALPHONCE REINICHE, a citizen of the United States of America, residing at Reading, in the county of Hillsdale and State of Michigan, have invented certain new and useful Improvements in Fruit-Gatherers, of which the following is a specification.

This invention relates to that form of fruit gatherer in which a flexible chute and hood are associated with means for severing the fruit from its stem; the severing means and hood being in such relation as to preclude escape of the fruit from the hood.

This invention also includes the provision of means for adjusting the hood with relation to the severing means, thereby adapting the gatherer for use in collecting large or small fruit.

An object of having the severing means and hood in operative relation is to cause the fruit to lie in contact with the hood when severed, in which position it will roll down the surface of the hood into the chute.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a side elevation of a fruit gatherer embodying the invention, the pole and handle being broken to reduce its length; Fig. 2, illustrates a front elevation of the gatherer with the shank and handle omitted.

In the drawings A denotes a horizontally disposed head having a shank B, to which a pole is attached comprising sections C and C', with the usual joint c. The handle may be provided with as many joints as is found desirable for the purpose of increasing its length. The head A, is straight and has a series of notches a in its side, it being understood that the two sides of the head are notched for the reception of the yoke D.

The yoke is approximately A-shaped and has a socket d to receive the head A. The yoke is preferably of springy material which will permit its being applied to and removed from the notches of the head, that the said yoke may be adjusted in any pair of notches for the purpose of locating the said yoke near to or remote from the prong E, which is formed on a depending extension F, of the head. The prongs are preferably diverged at their ends but lie parallel the greatest portion of their length. The shank B is provided with a spreader ring G, to which a chute H, is applied, said chute comprising in this instance a tubular net having a flared upper end secured to the ring.

For the purpose of guiding or directing the fruit severed from the limbs by the prong heretofore referred to, a hood I, is attached to the spreader ring, said hood extending nearly two-thirds of the circumference of the rim. The hood extends upwardly toward the head A, and is reduced in width. The hood has two extensions J, which are attached in eyes d', formed in the yoke D. By means of these securing devices, the hood is attached to the yoke and as the yoke is moved on the head, the position of the hood with relation to the prongs or fork is changed.

When very large fruit is being gathered, it will be desirable to move the yoke toward the shank of the head in order to increase the distance between the fork or prong and the hood. By this means, the space between the hood and prongs is increased and the fruit severed from the limb is directed to the chute by the hood. When small fruit is being gathered the yoke D, would be moved toward the depending portion F, of the head and the space between the hood and the prongs would be correspondingly reduced so that the fruit being picked would lie in contact with the hood and when it is severed from the limb it would be guided to the chute.

It has been found in practice that when the fruit is severed from the limb without its resting against the hood, the chute is moved from the path of travel of the fruit and the fruit often escapes the mouth of the opening of the chute. By the use of this invention, the liability of displacement of the chute from the path of travel of the fruit is obviated.

The manner of attaching the hood and chute to the spreader ring need not, it is thought, be described in detail as any appropriate means to accomplish this result may be employed.

What I claim is

1. In a fruit gatherer, a head having notches, a yoke adjustable in the notches, a shank for the head, a handle attached to the shank, fruit engaging prongs, a hood attached to the yoke and a chute below the hood.

2. In a fruit gatherer, a head having a shank and prongs, a yoke adjustable on the head, a hood attached to the yoke, a spreader ring, a chute on the spreader ring, the said hood being in such relation to the spreader ring as to direct the fruit to the chute.

3. In a fruit gatherer, a head, a yoke adjustable on the head, a hood attached to the yoke, prongs carried by the head, and a chute to which the fruit is directed by the hood.

4. A fruit gatherer having a head provided with notches, a yoke adjustable in the notches, a hood attached to the yoke, prongs carried by the head, and a chute to which the fruit is directed by the hood.

In testimony whereof I affix my signature in the presence of two witnesses.

ALPHONCE REINICHE.

Witnesses:
Z. G. CULVER,
OTIS ABBOTT.